Jan. 12, 1932.  A. W. PHELPS  1,840,739
TOOL FOR MANUFACTURING ARMATURES
Filed Nov. 27, 1929     3 Sheets-Sheet 1

Inventor
Alva W. Phelps
By Spencer Hardman & Fehr
his Attorneys

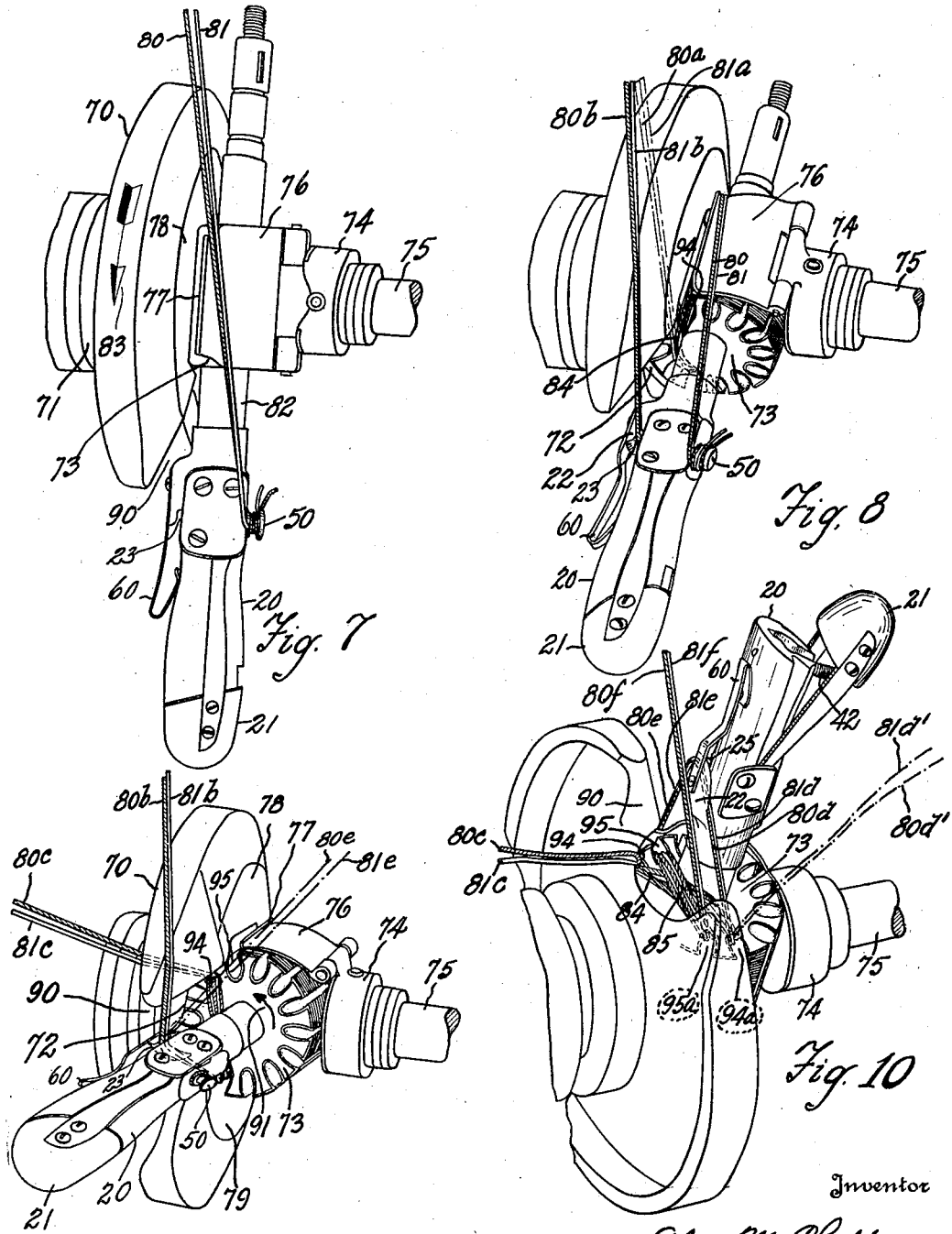

Patented Jan. 12, 1932

1,840,739

UNITED STATES PATENT OFFICE

ALVA W. PHELPS, OF ANDERSON, INDIANA, ASSIGNOR TO DELCO-REMY CORPORATION, OF ANDERSON, INDIANA, A CORPORATION OF DELAWARE

TOOL FOR MANUFACTURING ARMATURES

Application filed November 27, 1929. Serial No. 410,089.

This invention relates to the manufacture of armatures for dynamo electric machines and more particularly to armatures comprising an open slotted core upon which coils of flexible wire are wound, each coil having its active coil sides received by certain spaced slots of the armature core. In winding armatures of this type it has been the practice to form a loop of wire between consecutive coils wound upon the armature core, one branch of the loop being the end lead of a preceding coil, and the other branch being the start lead of a succeeding coil. After the coils joined by loop have been wound on the core, the loop is severed in order to provide two separate leads which may be joined with certain bars of a commutator associated with the armature.

It is one of the objects of the present invention to provide certain improvements in a tool adapted to be mounted upon an armature and providing means around which a loop of wire may be formed for the purpose specified. One example of such tool is described and claimed in Patent Number 1,661,331 of A. B. Gomory, patented March 6, 1928. This tool includes a tubular handle adapted to be placed over one end of an armature shaft projecting upon the end of an open slotted armature core. This tool provides an annular row of hooks or projections, each adapted to receive a loop of wire there being as many hooks as there are armature core slots. The loops are severed by use of a separate wire cutting tool. When using the tool disclosed in the Gomory patent it has been the custom to cut the loop into unequal parts, the end lead of a preceding coil being greater in length than the start lead of a succeeding coil. In this way the start leads are distinguished readily from the end leads.

More particularly, it is an object of the present invention to provide a tool for the manufacture of a wire wound armature comprising a frame adapted to be supported by the armature adjacent one end of its core and having provisions for forming a loop of wire between windings successively applied upon the armature core, and means carried by the frame for severing the loop in order to provide armature leads extending from the windings. Preferably the tool comprises a hollow handle adapted to be placed over a portion of the armature shaft extending beyond the armature core, said handle providing a shoulder portion around which the wire is placed in order to provide a loop. A moveable cutter cooperates with the shoulder portion in order to sever the wire into unequal portions. The cutter is preferably actuated by a relatively movable portion of the handle.

Further objects and advantages of the present invention will be apparent from the following description, reference being had to the accompanying drawings wherein a preferred embodiment of one form of the present invention is clearly shown.

Figs. 7 to 10 inclusive are fragmentary perspective views showing the use of the tool in forming and severing a loop between consecutively wound armature coils.

Figure 4:
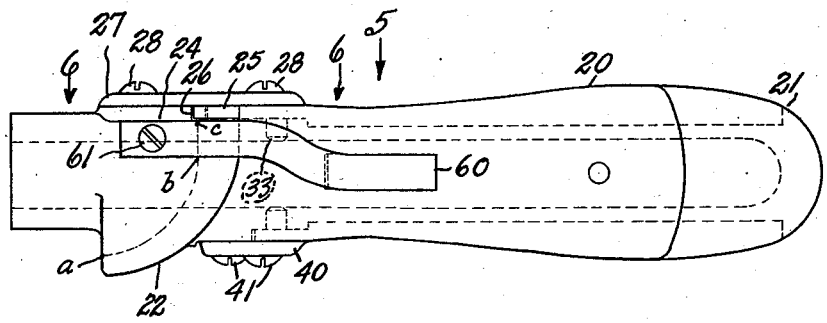
Fig. 4 is a side view looking in the direction of the arrow 4 of Fig. 1.

Referring to the drawings, the tool comprises a hollow handle including a main portion 20 and a relatively movable portion 21 forming a continuation at the free end thereof. The main portion 20 carries a hook or shoulder portion 22 which provides a groove or notch 23, the contour of which, as shown in Fig. 4, includes a ninety degree arcuate portion $ab$ and a straight portion $bc$, the portion $bc$ being at right angles to the surface 24 along which there is movable a reciprocating shear blade 25 guided by a straight channel or groove 26. The blade 25 is retained by a plate 27 secured by screws 28 to the main frame or handle portion 20.

Figure 1:
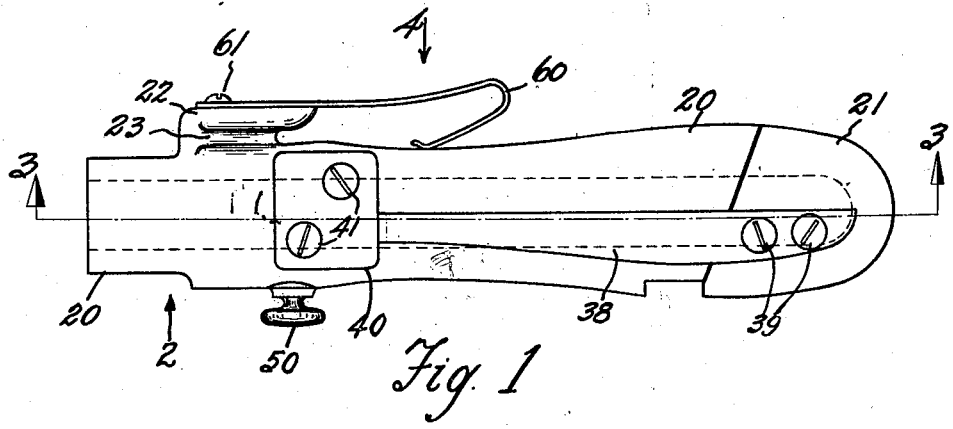
Fig. 1 is a side view of a tool embodying the present invention.
Figure 2:
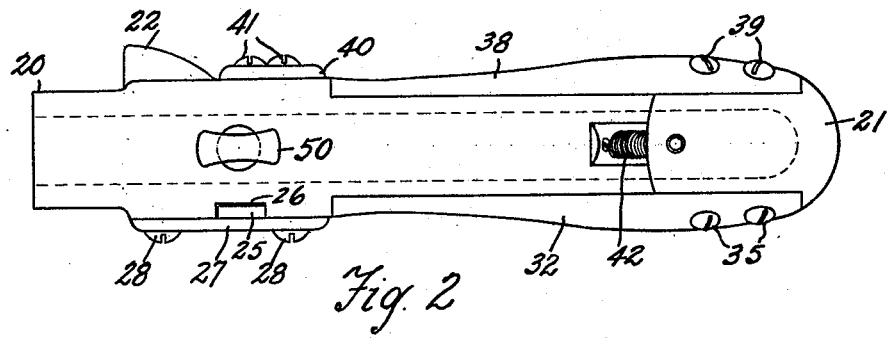
Fig. 2 is a side view looking in the direction of the arrow 2 in Fig. 1.
Figure 3:
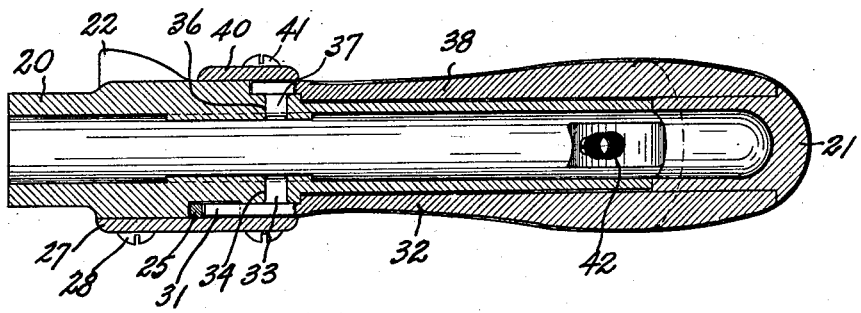
Fig. 3 is a sectional view on the line 3—3 of Fig. 1.
Figure 6:
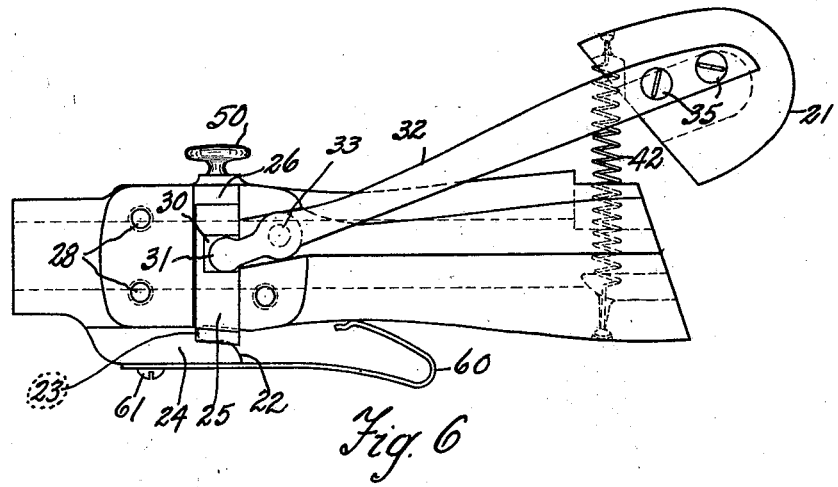
Fig. 6 is a view similar to Fig. 5 showing the cutter fully advanced to cut the loop of wire, the cutter being actuated by a portion of the handle which is shown out of alignment with the main portion thereof.
Figure 5:
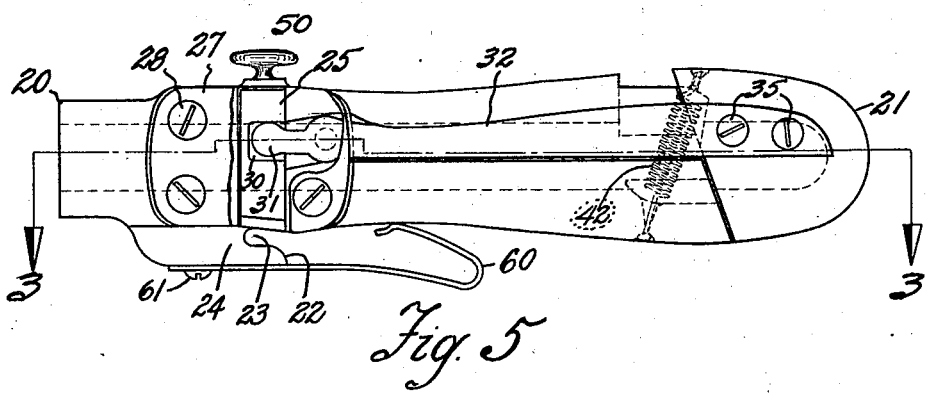
Fig. 5 is a side view looking in the direction of arrow 5 of Fig. 4.

The blade 25 has a notch 30 for receiving the end portion 31 of a lever 32 having a stud 33 pivotally received by a suitable hole 34 provided by the handle 20 as shown clearly in Fig. 3. Lever 32 is secured by screws 35 to the movable handle portion 21. Diametrically opposite the hole 34, the handle 20 provides a hole 36 for receiving a stud 37 carried by lever 38 located diametrically opposite the lever 32 and attached to the handle portion 21 by screws 39. The lever 38 is retained by a plate 40 attached by screws 41 to the handle 20. The handle 21 is normally maintained in alignment with the handle 20 by a tension spring 42 having its ends respectively attached to the handle portions 20 and 21. When the handle 21 is in alignment with the handle 20 as shown in Fig. 5 the knife 25 will be retracted from the notch 23 of the shoulder member 22. In order to cut a wire which may have been looped around the member 22 and received by the groove 23 the handle is moved from the position shown in Fig. 5 to that shown in Fig. 6 in order that the cutter blade 25 will move across the groove 23. The levers 32 and 38 are shaped to conform to the configuration of the handle portions 20 and 21.

Numeral 50 designates a post or snag around which the free end of the wire is wound at the start of an armature winding operation.

A leaf spring member 60 attached by screws 61 to the shoulder member 22 operates to prevent dislodgement of the loop of wire which is placed in the groove 23.

The manner of using the tool will now be described with reference to Figs. 7 to 10 inclusive. In Fig. 7 numeral 70 designates the winding head of an armature coil winding machine mounted upon a rotatable spindle 71 and providing a recess 72 for receiving a portion of the armature core 73 with its axis at right angles to and intersecting the axis of the spindle 71. The armature core 73 is maintained within the recess by a pressure block 74 rotatably mounted upon a stationary rod 75 having its axis in alignment with the axis of the spindle 71. The block 74 hingedly supports a hook plate 76 having a flange or hook 77 for a purpose to be described. The head 70 is provided with cheeks 78 and 79 which direct the wires 80 and 81 into certain spaced slots of the armature core 73.

After having located the armature core 73 upon the winding head 70 with the aid of the pressure block 74 as shown in Fig. 7, the operator places the tool which has been described upon one end portion 82 of the armature shaft. Figs. 7 to 10 show various stages in two consecutive winding operations, each winding operation consisting of winding into certain spaced slots two coils of wire formed of different colored wires 80 and 81. The free ends of the wires 80 and 81 are first wrapped around the post or snag 50 as shown in Fig. 7. The start leads of the first coil to be wound on are placed upon the hook plates 76, the flange 77 preventing the start leads from being wound into a core slot. Then the winding head 70 is rotated in the direction of the arrow 83 thereby causing the wires 80 and 81 to be wound into certain spaced slots 94 and 94a (see Fig. 10) of the core 73 in order to provide the first pair of coils designated by numeral 84 in Fig. 8. Following this operation the wires 80 and 81 leading from the ends of the first pair of coils 84 are moved from the positions indicated by dot and dash lines 80a and 81a and are placed around the shoulder member 22 as indicated by full lines 80b and 81b in Fig. 8. Thus the end leads of the first pair of coils 84 extend around the shoulder member 22 and thence to the reels of wire carrying the wires 80 and 81.

Following this operation the wire ends are unwrapped from the post 50 thus providing the starting leads of the first pair of coils 84, and that portion thereof which rested upon the hook plate 76 as shown in Fig. 8 is placed upon those active coil sides of the first pair of coils 84 which occupy the slot 94 of the core 73. The free ends of wire leading from these portions last placed within the slot 94 are passed through a notch 90 provided by the head 70 and are located in the position shown at 80c and 81c in Fig. 9 in order to be out of the way of the next winding operation. Before performing the next winding operation the pressure block 74 is retracted from the head 70 in order to permit indexing or rotating the core 73 in the direction of the arrow 91 in Fig. 9 through an angular distance equal to the angular spacing between armature core slots. As shown in Fig. 9 the next succeeding slot 95 has been located adjacent the cheek 78 and into this slot and a slot 95a spaced a certain distance therefrom.

Before winding the next pair of coils 85 upon the core 73 the wire ends 80b and 81b extending from the shoulder hook 22 are first placed upon the hook plate 76 in order that these start leads, like the start leads of the first coil wound on, may be kept out of the core slots until the winding of the coils connected with these leads has been completed. Numerals 80c and 81c refer respectively to the positions of the wires 80 and 81 shown in dot and dash lines in Fig. 9 when lying upon the hook plate 76 preparatory to winding on the second pair of coils 85. The use of the hook plate 76 is described in detail in Patent 1,622,185 of F. G. Dewey, patented March 22, 1927. The active coil sides directly connected with the start leads of a pair of coils are kept out of the armature core slots until after the pair of coils is wound off in order that the leads of the coil may emerge from the armature core as close as possible to the periphery thereof and so that these leads will not be buried next to the armature shaft under a mass of wires which over-lap at the ends of the armature core. This construction has been found to eliminate the abrupt bending of a lead at the time it is attached to a commutator segment and the elimination of abrupt bends has been found to materially minimize such injury to the insulation of the coils as would cause short circuits.

Fig. 10 shows the apparatus after the operation of winding the second pair of coils 85 upon the core 73. These coils have active coil sides occupying slots 95 and 95a which are respectively next in order to the slots 94 and 94a containing the active coil sides of the first pair of coils 84. It will be seen that a pair of loops of wire having the portions 80d, 81d, and 80e, 81e connects the end of the pair of coils 84 with the beginning of the pair of coils 85. This loop is severed by movement of the handle portion 21 into the position shown in Fig. 10 and Fig. 6, thereby severing the loop into unequal portions in order to distinguish the end leads from the start leads. Since the distance from the slot 94a to the blade 25 is greater than the distance from the blade 25 to the slot 95 it will be apparent that the end lead of the pair of coils 84, formed by the portions 80d and 81d will be greater than the start leads of the pair of coils 85, formed by the portions 80e and 81e.

After loop portions 80e, 81e have been severed from the other portions, these portions are moved toward the left through the notch 90 of the winding head 70 into positions similar to those occupied by the leads 80c and 81c. The loop portions 80d and 81d are moved toward the right into the positions indicated by the dotted lines 80d' and 81d'. After these loop portions have been moved away from the loop forming shoulder 22 the wires 80f and 81f, joining the end of the last pair of coils 85 with the reels of wire, are placed upon the shoulder 22 just as the wire portions 80b and 81b were placed upon the shoulder 22 as shown in Fig. 8. Then the armature core is indexed into a new position and the next winding operation takes place as before. These cycles of operation are repeated until all of the coils have been wound upon the core. When the last loop has been severed the loop forming and the loop cutting tool is removed. The severed leads are placed along side the armature shaft and the wire connecting the end of the last coil wound on with the wire reels is wound once or twice around the leads and shaft in order to hold leads in position. Then the wires are severed from the wire reels.

It is apparent from the aforegoing descrip tion of the construction and mode of operation of the loop forming and wire cutting tool that the winding of armatures has been facilitated by reason of the fact that the loop forming tool provides also the tool for cutting the loop. The operator is not required to reach for a wire cutter following each coil winding operation. It is a very simple matter to move the handle portion 21 in order to cut the loop since this portion is presented in front of the operator following each winding operation. Where a winding machine with an automatic stop is provided the stopping mechanism can be adjusted so that the machine will stop with the handle in front of the operator who, upon grasping the handle, moves its portion 21 out of alignment with the main portion 20 in order to cut the loop into the end and start lead portions respectively, of consecutively wound coils.

While the form of embodiment of the present invention as herein disclosed, constitutes a preferred form, it is to be understood that other forms might be adopted, all coming within the scope of the claims which follow.

What is claimed is as follows:

1. A tool for the manufacture of a wire wound armature including an open slotted core, comprising in combination, a frame adapted to be supported by the armature adjacent one end of its core and having provisions for forming a loop of wire between windings successively applied upon the armature core, and means carried by the frame for severing the loop in order to provide armature leads extending from said windings.

2. A tool for the manufacture of a wire wound armature including an open slotted core, comprising in combination, a frame adapted to be supported by the armature adjacent one end of its core and having provisions for forming a loop of wire between windings successively applied upon the armature core, and means carried by the frame for cutting the loop into parts unequal in length in order to provide leads of unequal length extending from the windings.

3. A tool for the manufacture of a wire-wound armature including an open slotted core, comprising in combination, a frame adapted to be supported by the armature adjacent one end of its core and having provisions for forming a loop of wire between windings successively applied upon the armature core and having a handle member one portion of which is movable relative to the frame and means actuated by the movable portion of the handle for severing the loop in order to provide armature leads extending from said windings.

4. A tool for the manufacture of a wire-wound armature including an open slotted core, comprising in combination, a frame adapted to be supported by the armature adjacent one end of its core and having a shoulder member around which wire is passed to form a loop between windings successively applied upon the armature core, a movable blade cooperating with the shoulder to sever the loop, and means carried by the frame for operating the blade.

5. A tool for the manufacture of a wirewound armature including an open slotted core, comprising in combination, a frame adapted to be supported by the armature adjacent one end of its core and having a shoulder member around which wire is passed to form a loop between windings successively applied upon the armature core, a movable blade cooperating with the shoulder at one end portion thereof in order to cut the loop into parts unequal in length, and means carried by the frame for operating the blade.

6. A tool for the manufacture of a wirewound armature including a shaft and an open slotted core mounted thereon, comprising in combination, a tubular frame adapted to be mounted upon said shaft adjacent one end of the core and having provisions for forming a loop of wire between windings successively applied upon the armature core, and means carried by the frame for severing the loop in order to provide armature leads extending from said windings.

7. A tool for the manufacture of a wirewound armature including a shaft and an open slotted core mounted thereon, comprising in combination, a hollow handle adapted to be mounted upon said shaft adjacent one end of the core and having a movable portion adjacent one end and having shoulder member around which wire is passed to form a loop between windings successively applied upon the armature core, a movable blade cooperating with the shoulder to sever the loop, and means operated by the movable portions of the handle for operating the blade.

8. A tool for the manufacture of a wirewound armature including an open slotted core, comprising in combination, a frame adapted to be supported by the armature adjacent one end of its core and having provisions for forming a loop of wire between windings successively applied upon the armature core and having a handle member one portion of which is movable relative to the frame, a stationary cutting member carried by said frame and a blade cooperating therewith and secured to the movable portion of the handle, whereby on moving said movable portion of the handle relative to the fixed frame the wire loop may be severed.

In testimony whereof I hereto affix my signature.

ALVA W. PHELPS.